(12) United States Patent  (10) Patent No.: US 8,971,533 B2
Wall et al.  (45) Date of Patent: *Mar. 3, 2015

(54) SECURE RESET OF PERSONAL AND SERVICE PROVIDER INFORMATION ON MOBILE DEVICES

(71) Applicant: Google Inc., Mountain View, CA (US)

(72) Inventors: Jonathan Wall, San Francisco, CA (US); Rob von Behren, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/868,041

(22) Filed: Apr. 22, 2013

(65) Prior Publication Data

US 2013/0266140 A1  Oct. 10, 2013

Related U.S. Application Data

(63) Continuation of application No. 13/547,029, filed on Jul. 11, 2012, now Pat. No. 8,429,409.

(60) Provisional application No. 61/621,081, filed on Apr. 6, 2012.

(51) Int. Cl.
*G06F 21/00* (2013.01)
*H04L 9/08* (2006.01)
(Continued)

(52) U.S. Cl.
CPC ............ *H04L 9/08* (2013.01); *G06Q 20/3227* (2013.01); *G06Q 20/3672* (2013.01);
(Continued)

(58) Field of Classification Search
CPC ........................................................ H04L 9/28
See application file for complete search history.

(56) References Cited

U.S. PATENT DOCUMENTS 4,851,653 A  7/1989  Limisaque et al.
5,221,838 A  6/1993  Gutman et al.
(Continued)

FOREIGN PATENT DOCUMENTS

CN  102204299 A  9/2011
DE  19925389 A1  12/2000
(Continued)

OTHER PUBLICATIONS

Schossmaier, K., European Office Action issued in European Application No. 12769000.6, pp. 1-5, Aug. 14, 2013.
(Continued)

*Primary Examiner* — Benjamin Lanier
*Assistant Examiner* — Wayne An
(74) *Attorney, Agent, or Firm* — Johnson, Marcou & Isaacs, LLC

(57) ABSTRACT

Systems and methods are described herein for supporting end users of a mobile device, such as a mobile phone, to reset a secure element associated with the communication device. The reset process may include clearing the secure element, associated memories, and storage devices of any user specific or personalized information associated with the user. The reset process may also include removing or resetting keys or other identifiers within the secure element that associate the mobile device with a particular secure service provider. According to various embodiments, a computer-implemented method for resetting a secure element within a network device may include receiving an encrypted reset request message at the secure element, decrypting the encrypted reset request message using a communication key, verifying authorization for the reset request message, and atomically clearing parameters associated with the secure element.

27 Claims, 8 Drawing Sheets

(51) Int. Cl.
*G06Q 20/32* (2012.01)
*G06Q 20/36* (2012.01)
*H04L 9/32* (2006.01)
*H04W 12/04* (2009.01)
*H04M 15/00* (2006.01)

(52) U.S. Cl.
CPC ........... *H04L 9/0894* (2013.01); *H04L 9/0897* (2013.01); *H04L 9/3263* (2013.01); *H04W 12/04* (2013.01); *H04M 15/48* (2013.01); *H04L 2209/12* (2013.01); *H04L 2209/50* (2013.01); *H04L 2209/805* (2013.01); *H04L 2209/56* (2013.01)
USPC ......................................... 380/255; 713/172

(56) References Cited

U.S. PATENT DOCUMENTS

| | | | |
|---|---|---|---|
| 5,321,242 A | 6/1994 | Heath, Jr. |
| 5,692,049 A | 11/1997 | Johnson et al. |
| 5,787,173 A | 7/1998 | Seheidt et al. |
| 5,872,849 A | 2/1999 | Sudia |
| 5,991,399 A | 11/1999 | Graunke et al. |
| 6,005,942 A | 12/1999 | Chan et al. |
| 6,041,123 A | 3/2000 | Colvin, Sr. |
| 6,092,201 A | 7/2000 | Turnbul et al. |
| 6,101,477 A | 8/2000 | Hohle et al. |
| 6,141,752 A | 10/2000 | Dancs et al. |
| 6,151,657 A | 11/2000 | Sun et al. |
| 6,230,267 B1 | 5/2001 | Richards et al. |
| 6,233,683 B1 | 5/2001 | Chan et al. |
| 6,402,028 B1 | 6/2002 | Graham, Jr. et al. |
| 6,434,238 B1 | 8/2002 | Chaum et al. |
| 6,484,174 B1 | 11/2002 | Wall et al. |
| 6,601,761 B1 | 8/2003 | Katis |
| 6,609,113 B1 | 8/2003 | O'Leary et al. |
| 6,633,984 B2 | 10/2003 | Susser et al. |
| 6,647,260 B2 | 11/2003 | Dusse et al. |
| 6,732,278 B2 | 5/2004 | Baird et al. |
| 6,792,536 B1 | 9/2004 | Teppler |
| 6,823,520 B1 | 11/2004 | Susser et al. |
| 6,907,608 B1 | 6/2005 | Susser et al. |
| 6,922,835 B1 | 7/2005 | Susser et al. |
| 6,963,270 B1 | 11/2005 | Gallagher, III et al. |
| 7,093,122 B1 | 8/2006 | Susser et al. |
| 7,140,549 B2 | 11/2006 | De Jong |
| 7,152,782 B2 | 12/2006 | Shenker et al. |
| 7,159,180 B2 | 1/2007 | Ward |
| 7,165,727 B2 | 1/2007 | de Jong |
| 7,191,288 B2 | 3/2007 | de Jong |
| 7,206,769 B2 | 4/2007 | Laurent et al. |
| 7,232,073 B1 | 6/2007 | De Jong |
| 7,243,853 B1 | 7/2007 | Levy et al. |
| 7,275,685 B2 | 10/2007 | Gray et al. |
| 7,346,170 B2 | 3/2008 | Asano et al. |
| 7,349,885 B2 | 3/2008 | Gangi |
| 7,353,396 B2 | 4/2008 | Micali et al. |
| 7,360,691 B2 | 4/2008 | Takayama |
| 7,374,099 B2 | 5/2008 | De Jong |
| 7,382,762 B2 | 6/2008 | Chmora et al. |
| 7,392,378 B1 | 6/2008 | Elliott |
| 7,395,535 B2 | 7/2008 | Susser et al. |
| 7,469,151 B2 | 12/2008 | Khan et al. |
| 7,478,389 B2 | 1/2009 | Susser et al. |
| 7,502,946 B2 | 3/2009 | Perkins et al. |
| 7,567,674 B2 | 7/2009 | Nishimoto et al. |
| 7,607,175 B2 | 10/2009 | Susser et al. |
| 7,631,346 B2 | 12/2009 | Hinton et al. |
| 7,631,810 B2 | 12/2009 | Liu et al. |
| 7,708,198 B2 | 5/2010 | Gangi |
| 7,712,658 B2 | 5/2010 | Gangi |
| 7,739,731 B2 | 6/2010 | Violleau et al. |
| 7,757,086 B2 | 7/2010 | Walmsley |
| 7,860,486 B2 | 12/2010 | Frank et al. |
| 7,967,215 B2 | 6/2011 | Kumar et al. |
| 8,060,449 B1 | 11/2011 | Zhu |
| 8,120,460 B1 | 2/2012 | Zhu |
| 8,126,806 B1 | 2/2012 | DiMartino et al. |
| 8,150,767 B2 | 4/2012 | Wankmueller |
| 8,171,137 B1 | 5/2012 | Parks et al. |
| 8,171,525 B1 | 5/2012 | Pelly et al. |
| 8,196,131 B1 | 6/2012 | von Behren et al. |
| 8,255,687 B1 | 8/2012 | Pelly et al. |
| 8,297,520 B1 | 10/2012 | Wakerly et al. |
| 8,313,036 B1 | 11/2012 | Wakerly et al. |
| 8,335,921 B2 | 12/2012 | von Behren et al. |
| 8,335,932 B2 | 12/2012 | von Behren et al. |
| 8,352,749 B2 | 1/2013 | von Behren |
| 8,379,863 B1 | 2/2013 | Pelly et al. |
| 8,385,553 B1 | 2/2013 | Jooste et al. |
| 2001/0011250 A1 | 8/2001 | Paltenghe et al. |
| 2001/0021927 A1 | 9/2001 | Laurent et al. |
| 2001/0027441 A1 | 10/2001 | Wankmueller |
| 2001/0039657 A1 | 11/2001 | Fopeano et al. |
| 2002/0004783 A1 | 1/2002 | Paltenghe et al. |
| 2002/0042776 A1 | 4/2002 | Woo et al. |
| 2002/0068554 A1 | 6/2002 | Dusse |
| 2002/0194138 A1 | 12/2002 | Dominguez et al. |
| 2003/0023954 A1 | 1/2003 | Wilkinson et al. |
| 2003/0074579 A1 | 4/2003 | Della-Libera et al. |
| 2003/0140176 A1 | 7/2003 | Susser et al. |
| 2004/0029569 A1 | 2/2004 | Khan et al. |
| 2004/0030601 A1 | 2/2004 | Pond et al. |
| 2004/0123152 A1 | 6/2004 | Le Saint |
| 2004/0128259 A1 | 7/2004 | Blakeley et al. |
| 2004/0140351 A1 | 7/2004 | Flugge et al. |
| 2004/0250066 A1 | 12/2004 | Di Luoffo et al. |
| 2005/0001711 A1 | 1/2005 | Doughty et al. |
| 2005/0071418 A1 | 3/2005 | Kjellberg et al. |
| 2005/0091659 A1 | 4/2005 | Susser et al. |
| 2005/0102679 A1 | 5/2005 | Susser et al. |
| 2005/0149926 A1 | 7/2005 | Saltz |
| 2005/0184163 A1 | 8/2005 | de Jong |
| 2005/0184164 A1 | 8/2005 | de Jong |
| 2005/0184165 A1 | 8/2005 | De Jong |
| 2005/0188360 A1 | 8/2005 | De Jong |
| 2005/0193218 A1 | 9/2005 | Susser et al. |
| 2005/0222961 A1 | 10/2005 | Staib et al. |
| 2006/0036570 A1 | 2/2006 | Schaefer et al. |
| 2006/0041507 A1 | 2/2006 | Novack et al. |
| 2006/0126831 A1 | 6/2006 | Cerruti et al. |
| 2006/0165060 A1 | 7/2006 | Dua |
| 2006/0219774 A1 | 10/2006 | Benco et al. |
| 2007/0067325 A1 | 3/2007 | Weitzner et al. |
| 2007/0090195 A1 | 4/2007 | Kawamura et al. |
| 2007/0135164 A1 | 6/2007 | Lee |
| 2007/0169043 A1 | 7/2007 | Violleau et al. |
| 2007/0226786 A1 | 9/2007 | Berger et al. |
| 2008/0056501 A1 | 3/2008 | McGough et al. |
| 2008/0073426 A1 | 3/2008 | Koh et al. |
| 2008/0130902 A1 | 6/2008 | Foo Kune et al. |
| 2008/0162834 A1 | 7/2008 | Brokenshire et al. |
| 2008/0167988 A1 | 7/2008 | Sun et al. |
| 2008/0208681 A1 | 8/2008 | Hammad et al. |
| 2008/0208762 A1 | 8/2008 | Arthur et al. |
| 2008/0270253 A1 | 10/2008 | Huang |
| 2009/0158028 A1 | 6/2009 | Jung et al. |
| 2009/0239512 A1 | 9/2009 | Hammad et al. |
| 2009/0261172 A1 | 10/2009 | Kumar et al. |
| 2009/0307139 A1 | 12/2009 | Mardikar et al. |
| 2009/0307142 A1 | 12/2009 | Mardikar |
| 2009/0312011 A1 | 12/2009 | Huomo et al. |
| 2010/0012732 A1 | 1/2010 | Pinzinger et al. |
| 2010/0042824 A1 | 2/2010 | Lee et al. |
| 2010/0050271 A1 | 2/2010 | Saarisalo |
| 2010/0058463 A1 | 3/2010 | Bertin |
| 2010/0063893 A1 | 3/2010 | Townsend |
| 2010/0088237 A1 | 4/2010 | Wankmueller |
| 2010/0088518 A1 | 4/2010 | Dottax |
| 2010/0106967 A1 | 4/2010 | Johansson et al. |
| 2010/0114731 A1 | 5/2010 | Kingston et al. |
| 2010/0131413 A1 | 5/2010 | Kranzley et al. |
| 2010/0138518 A1 | 6/2010 | Aiglesorfer et al. |
| 2010/0203870 A1 | 8/2010 | Hubinak et al. |

(56) References Cited

U.S. PATENT DOCUMENTS

| | | | |
|---|---|---|---|
| 2010/0205432 A1 | 8/2010 | Corda et al. |
| 2010/0207742 A1 | 8/2010 | Buhot et al. |
| 2010/0211507 A1 | 8/2010 | Aabye et al. |
| 2010/0250956 A1 | 9/2010 | Reed et al. |
| 2010/0291896 A1 | 11/2010 | Corda |
| 2010/0291904 A1 | 11/2010 | Musfeldt et al. |
| 2010/0306076 A1 | 12/2010 | Taveau et al. |
| 2010/0306107 A1 | 12/2010 | Nahari |
| 2010/0306531 A1 | 12/2010 | Nahari |
| 2010/0323681 A1 | 12/2010 | Corda et al. |
| 2010/0330958 A1 | 12/2010 | Corda et al. |
| 2011/0016275 A1 | 1/2011 | Lemonnier et al. |
| 2011/0029671 A1 | 2/2011 | Deprun et al. |
| 2011/0053504 A1 | 3/2011 | Corda |
| 2011/0072425 A1 | 3/2011 | Lemonnier et al. |
| 2011/0078081 A1 | 3/2011 | Pirzadeh et al. |
| 2011/0087610 A1 | 4/2011 | Batada et al. |
| 2011/0099605 A1 | 4/2011 | Cha et al. |
| 2011/0113473 A1 | 5/2011 | Corda et al. |
| 2011/0131421 A1 | 6/2011 | Jogand-Coulomb et al. |
| 2011/0306318 A1 | 12/2011 | Rodgers et al. |
| 2012/0009873 A1 | 1/2012 | Corda et al. |
| 2012/0129452 A1 | 5/2012 | Koh et al. |

FOREIGN PATENT DOCUMENTS

| | | | |
|---|---|---|---|
| EP | 1004992 A2 | 5/2000 |
| EP | 1318488 A2 | 6/2003 |
| EP | 2043060 A1 | 4/2009 |
| EP | 2365469 A1 | 9/2011 |
| EP | 2448171 A1 | 5/2012 |
| GB | 2457221 A | 8/2009 |
| JP | 2003-032237 | 1/2003 |
| JP | 2011-525028 A | 12/2010 |
| JP | 5519086 | 6/2014 |
| KR | 100600508 | 7/2005 |
| KR | 10-2006-0035421 | 4/2006 |
| KR | 10-2009-0051823 | 5/2009 |
| WO | WO 98/43212 A1 | 10/1998 |
| WO | WO 98/52158 A2 | 11/1998 |
| WO | WO 01/22374 | 3/2001 |
| WO | WO 2004/054125 | 6/2004 |
| WO | WO 2009/043859 A1 | 4/2009 |
| WO | WO 2010/150817 A1 | 12/2010 |

OTHER PUBLICATIONS

Babin, G., Canadian Office Action issued in Application No. 2,811,215, pp. 1-2, Oct. 7, 2013.
Lau, A., Canadian Office Action issued in Application No. 2,825,457, pp. 1-3, Oct. 25, 2013.
U.S. Appl. No. 60/338,419, filed Dec. 4, 2001, Merckling et al.
AN1787—MIFARE Application Mifare Application Directory (MAD), *NXP Semiconductors—MIFARE Application Directory*, pp. 1-23, Jul. 7, 2010.
Data Sheet: MIFARE—Standard Card IC—MF1 IC S50 Functional Specification, *Philips Semiconductors—Product Specification—Rovision 4.0*, pp. 1-18, Jul. 1, 1998.
Santa Clara Puts Payments in "Palm" of Your Hand: Palms and Cellphones Initiate Payments to Campus Card System, CR80 News.com, vol./Iss:2(5), pp. 1-3, May 1, 2003.
Mobile Payments at the Physical Point-of-Sale: Assessing U.S. Market Drivers and Industry Direction, *Smart Card Alliance Report—Publication No. PT-05001*, pp. 1-52, Apr. 1, 2005.
Global Platform Card—Contactless Services, Card Specification v2.2—Amendment C, *Global Platform Public Release—Document Reference: GPC SPE 025*, pp. 1-77, Feb. 1, 2010.
The Role of TSM, *Gemalto—The Review*, Jan. 1, 2008.
Smart-card Devices and Applications, pp. 1-13, Jan. 1, 2001.
Boly et al., ESCORICS 94 (Third European Symposium on Research in Computer Security) LNCS 875, pp. 217-230, Nov. 7, 1994.
Chen, Zhiqun, How to Write a JAVA Card Applet: A Developer's Guide, *JavaWorld*, pp. 1-9, Jul. 1, 1999.
Corum, Chris, Card Offices Increase their Focus on Off-Campus Merchant Programs, CR8ONews.com, vol./Iss:2(5), pp. 1-5, May 1, 2003.
Daswani et al., SWAPEROO: A Simple Wallet Architecture for Payments, Exchanges, Refunds, and Other Operations, *USENIX—3rd USENIX Workshop on Electronic Commerce*, pp. 1-20, Date: Aug. 31, 1998.
Dotzer, Florian, Aspects of Multi-Application Smart Card Management Systems, *Thesis at Technical University of Munich, Chair of Date Processing*, pp. 1-124, Date: Oct. 15, 2002.
Hehn, Eva, International Search Report and Written Opinion for International Patent Application No. PCT/US2012/032560, pp. 1-10, Jul. 26, 2012.
Hernandez-Suesta, Raul, E-Wallet with Decentralized Credentialed Keepers, *Masters Thesis—Norges Teknisk—Naturvitenskapelige Universitet*, pp. 1-74, Jun. 30, 2003.
Hernandez et al., E-Wallet Software Architecture with Decentralized Credentials, *Masters Thesis—Norwegian University of Science and Technology*, pp. 1-12, Jan. 1, 2003.
Huang et al., Future Personal "E-Payment": IRFM, *IEEE Wireless Communications*, pp. 1-7, Feb. 1, 2006.
Kim, S. G., International Search Report and Written Opinion for International Application No. PCT/US2013/035521, pp. 1-9, Jul. 25, 2013.
Lee, D.Y., International Search Report and Written Opinion issued in International Application No. PCT/US2013/027700, pp. 1-10, Jun. 17, 2013.
Mjolsnes et al., On-Line E-Wallet System with Decentralized Credential Keepers, *Mobile Networks and Applications*, pp. 1-13, Feb. 1, 2003.
Retrieved from http://www.europeanpaymentscouncil., EPC-GSMA Trusted Service Manager—Service Management Requirements and Specifications, retrieved from http://www.europeanpaymentscouncil., pp. 1-60 , Jan. 1, 2010.
Schossmaier, K., EPO Search Report issued in Appl. No. 12769000.6, pp. 1-3, Jul. 31, 2013.
Song, H., Office Action issued in co-pending U.S. Appl. No. 13/443,671, filed Apr. 10, 2012, pp. 1-8, Aug. 6, 2012.
Song, H., Office Action issued in co-pending U.S. Appl. No. 13/523,637, filed Jun. 14, 2012, pp. 1-6, Jul. 30, 2012.
Song, H., Office Action issued in copending U.S. Appl. No. 13/776,660, filed Feb. 25, 2013, pp. 1-6, May 9, 2013.
Song, H., Office Action issued in copending U.S. Appl. No. 13/752,355, filed Jan. 28, 2013, pp. 1-9, Aug. 27, 2013.
Song, Hosuk—USPTO Examiner, US Office issued in copending Appl. No: 13/244,889, filed Sep. 26, 2011, *USPTO Office Action Action*, pp. 1-8, Dec. 5, 2011.
Sun Microsystems, Inc., Runtime Environment Specification—Java Card Platform, Version 3.0, Classic Edition, pp. 1-158, Mar. 1, 2008.
Yin, Sara, Google Wallet Is Just Another Pilot, Says World's Largest SIM Card Maker, PCMag.com, pp. 1, May 27, 2011.
Yin, Sara, Google Wallet Aims to Take Mobile Payments Mainstream, PCMag.com, pp. 1-2, May 26, 2011.
Yixin et al., Design of Objects Sharing Mechanisms with Security Domain in Java, *2009International Conference on Electronic Computer Technology*, pp. 1-5 Feb. 20, 2009.
Yliuntinen, 3rd Party TSM Management of SIM Cards, *Cryptomathic*pp. 1-5, Sep. 1, 2011.
Young, L. S., International Search Report and Written Opinion issued in International Application No. PCT/US2012/050479, pp. 1-10, Feb. 1, 2013.
Yun et al., Design and Inplementation of Wirless Payment System using GVM and MobileC, *Proceedings of the International Conference on Mobile Computing and Ubiquitous Networking*, pp. 1-10, Apr. 13, 2005.
Zecher, C., Office Action issued in copending U.S. Appl. No. 13/547,029, filed Jul. 11, 2012, pp. 1-13, Sep. 20, 2012.
Chinese Office Action issued in Application No. 201380000186.4, pp. 1-22, Jun. 4, 2014.
3rd Generation Partnership Project 3GPP TR 33.812 V9.2.0, *3rd Generation Partnership Project*, pp. 1-87, Jun. 1, 2010.
Global Platform Proposition for NFC Mobile: Secure Element Mangement & Messaging, pp. 1-36, Apr. 2009.

(56) References Cited

OTHER PUBLICATIONS

Chinese Office Action issued in Application No. 201280003150.7, pp. 1-26, Feb. 21, 2014.
ANSI/X9 X9.24-I : 2004 Retail Financial Services Symmetric Key Management Part I : Using Symmetric Techniques, pp. 1-71, Feb. 4, 2004.
Kaneki, Y., Japanese Office Action issued in Application No. 2013-534076, pp. 1-4, Aug. 27, 2013.
Menezes et al., Key Establishment Protocols, Handbook of Applied Cryptography, pp. 489-541 Jan. 1, 1997.
Nakazato. H., Japanese Office Action issued in Application No. 2014-076015, pp. 1-13, May 7, 2014.
Park, J., Korean Office Action issued in Application No. 10-2013-70067529, pp. 1-4, Nov. 26, 2013.
Park, J., Korean Office Action issued in Application No. 10-20137010284, pp. 1-6 Nov. 26, 2013.
Sanchez, R., EPO Extended Search Report issued in Application No. 13714841.7, pp. 1-10, Mar. 7, 2014.
Sanchez, R., EPO Extended Search Report issued in Application No. 13744414.7, pp. 1-10, Mar. 7, 2014.
Savin, D., Canadian Office Action issued in Application No. 2,813,167, pp. 1-2, Aug. 21, 2013.
Yamamoto, M., Japanese Office Action issued in Application No. 2014-509525, pp. 1-4, Apr. 7, 2014.
Author: Aoki, S., Title: Japanese Office Action issued in Application No. 2013-207763, pp. 1-7, Aug. 26, 2014.

SECURE RESET OF PERSONAL AND SERVICE PROVIDER INFORMATION ON MOBILE DEVICES

RELATED APPLICATIONS

This patent application is a continuation of and claims priority to U.S. patent application Ser. No. 13/547,029, filed Jul. 11, 2012 and entitled "Secure Reset Of Personal And Service Provider Information On Mobile Devices" (now U.S. Pat. No. 8,429,409 issued Apr. 23, 2013), which claims priority under 35 U.S.C. §119 to U.S. Provisional Patent Application No. 61/621,081, filed Apr. 6, 2012 and entitled "Secure Reset Of Personal And Service Provider Information On Mobile Devices." The entire contents of the above-identified priority applications are hereby fully incorporated herein by reference.

TECHNICAL FIELD

The present disclosure relates to systems and methods for enabling mobile device users to reset or clear the contents of secure elements associated with mobile communication devices.

BACKGROUND

The current Near Field Communication ("NFC") eco-system relies on a piece of hardware commonly referred to as a "secure element" installed on communication devices to provide a secure operating environment for financial transactions, transit ticketing, physical security access, and other functions. A secure element generally includes its own operating environment with a tamper-proof microprocessor, memory, and operating system. A Trusted Service Manager (TSM), among other things, installs, provisions, and personalizes the secure element. The secure element has one or more keys that are typically installed at manufacture time. A corresponding key is shared by the TSM so that the TSM can establish a cryptographically secure channel to the secure element for installation, provisioning, and personalization of the secure element while the device having the secure element is in the possession of an end user. In this way, the secure element can remain secure even if the host CPU in the device has been compromised.

The problem with current NFC systems is that there is a tight coupling between the secure element and the TSM. For current deployments, only one TSM has access to the keys of a particular secure element. Therefore, the end user can choose to provision secure element features that are supplied by the one TSM only. The manufacturer of the device typically chooses this TSM. For example, a smart phone manufacturer may select the TSM for smart phones under guidance from a Mobile Network Operator ("MNO"), such as SPRINT or VERIZON, that purchases the smart phone rather than the end user. Thus, the TSM features available to the end user may not be in the end user's interest. As an example, the MNO may have a business relationship with one payment provider, such as MASTERCARD or BANK of AMERICA, only. That TSM may allow the secure element to be provisioned with payment instructions from the one payment provider only. Thus, the end user would not be able to access services from other payment providers, such as VISA.

In addition to not being able to change TSM pairings to keys in the secure element, the end user is not able to clear their private data and keys from the secure element. This may be desirable when selling, transferring, returning, or exchanging devices. The end user may wish to remove their information for privacy and security as well as preparing the device to allow the new user to select their own secure services to run on the device.

SUMMARY

In certain exemplary embodiments described herein, methods and systems can support an end user of a mobile device, such as a mobile phone, to reset a secure element associated with the communication device. The reset process may include clearing the secure element, associated memories, and storage devices of any user specific or personalized information associated with the user. The reset process may also include removing or resetting keys or other identifiers within the secure element that associate the mobile device with a particular secure service provider.

According to various embodiments, a computer-implemented method for resetting a secure element within a network device may include receiving an encrypted reset request message at the secure element, decrypting the encrypted reset request message using a communication key, verifying authorization for the reset request message, and atomically clearing parameters associated with the secure element.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
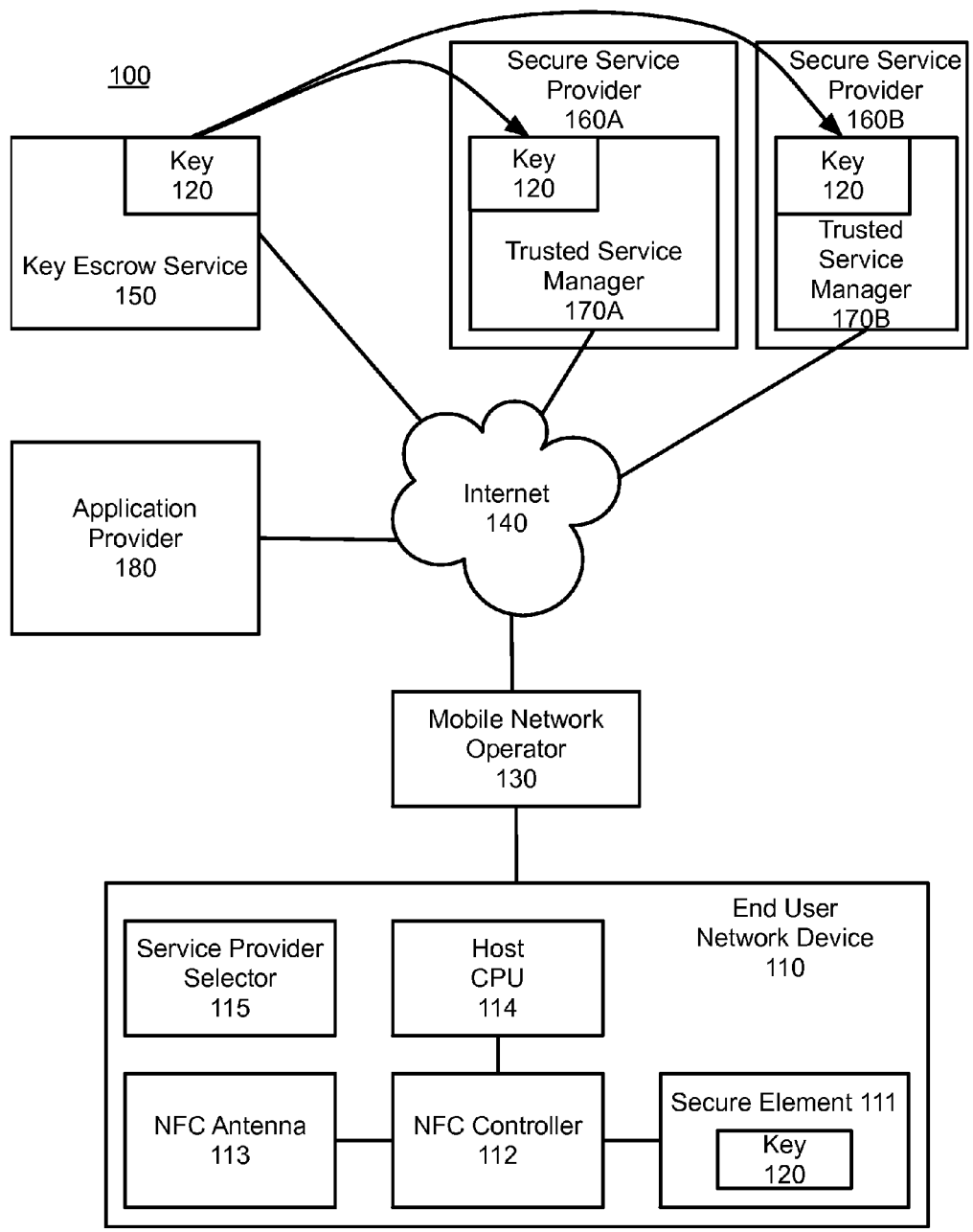
FIG. 1 depicts a Near Field Communication ("NFC") system, in accordance with certain exemplary embodiments.

The methods and systems described herein enable an end user of a mobile device, such as a mobile phone, to reset a secure element associated with the communication device. The reset process may include clearing the secure element, associated memories, and storage devices of any user specific or personalized information associated with the user. The reset process may also include removing or resetting keys or other identifiers within the secure element that associate the mobile device with a particular secure service provider. In various embodiments, a reset mechanism may be provided to support securely wiping or resetting existing data from a secure device. The mechanism may incorporate a secure identification technique to verify appropriate authority to reset the device. Such a process may be used to leave the device in a cleared state or to install new keys, new identities, or new provider associations.

Technology to securely reset or clear a secure element associated with a communication device as described herein can support an end user of a communication device, such as a mobile phone, to select or change a secure service provider to use with a secure element stored on the communication device. In one embodiment, a system includes a key escrow service that manages cryptographic keys for one or more users and one or more secure service providers. Typically, the secure element and one or more cryptographic keys for the secure element are installed on each user communication device at the time that the communication devices are manufactured. These keys or corresponding keys are provided to the key escrow service. Each user device also includes a service provider selector ("SPS") module or software application that enables the users to select from available secure service providers. The SPS transmits, via a secure channel, information identifying the selected service provider to the key escrow service in response to a user selection. The key escrow service provides the key for the user's secure element to a Trusted Service Manager ("TSM") of the selected secure service provider. The key escrow service also revokes the key for the user's secure element from the TSM of the user's previous secure service provider. In addition, the SPS can prevent unauthorized secure service providers, such as the previous secure service provider, from accessing the secure element.

In another embodiment, a central TSM performs business logic and application provisioning on behalf of other secure service providers. Rather than distributing the cryptographic keys to selected secure service providers, the central TSM acts as a proxy between the selected secure service provider and the secure element installed on the communication device.

The exemplary systems and methods described herein overcome the deficiencies of conventional NFC systems to allow users to reset or wipe secure identifiers and associations. This ability can support reassignment of secure devices as well as simplified access to services of more than one secure service provider. Rather than being limited to the functionality and services provided by the one secure service provider, the user can dissociate from a current provider and select from multiple secure service providers. For example, if a secure service provider does not provide services that the user desires, such as making payments via a particular brand of credit card, the user can select a secure service provider that does provide these services.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. Moreover, any reference to an act being performed by a computer should not be construed as being performed by a single computer as the act may be performed by more than one computer. The functionality of the exemplary embodiments will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

FIG. 1 depicts a Near Field Communication ("NFC") system 100, in accordance with certain exemplary embodiments. As depicted in FIG. 1, the system 100 includes one or more end user network devices 110, one or more application providers 180, a key escrow service 150, a mobile network operator ("MNO") 130, and multiple secure service providers 160. Each of the application providers 180, key escrow service 150, and secure service providers 160 include a network device configured to communicate via the Internet 140. For example, each of the application providers 180, key escrow service 150, and secure service providers 160 may include a server, desktop computer, laptop computer, tablet computer, smartphone, handheld computer, personal digital assistant ("PDA"), or any other wired or wireless, processor-driven device. In one embodiment, the key escrow service 150 includes (or is communicably coupled to) a first network communication module for receiving requests to change (or select) from available secure service providers 160 and a second network communication module for transmitting cryptographic keys 120 to secure service providers 160. The first and second network communication modules may be the same or different network communication modules.

The end user network devices 110 may be mobile phones, smart phones, PDAs netbook computers, laptop computers, tablet computers, or any other wired or wireless, processor-driven device. As shown in FIG. 1, the end user network devices 110 access the Internet 140 via the MNO 130. Exemplary MNOs include VERIZON, SPRINT, and AT&T. The MNOs provide Internet access to the end user network devices 110 via a mobile network (not shown), such as a 3G or 4G mobile communication network. Of course, the end user network devices 110 can access the Internet 140 via other mechanisms, such as Wi-Fi in connection with an Internet provider.

The end user network devices 110 each include a secure element 111 having one or more cryptographic keys 120, an NFC controller 112, an NFC antenna 113, an host CPU 114, and an SPS 115. The NFC controller 112 and the NFC antenna 113 enable the end user network device 110 to communicate with other NFC-enabled devices (not shown). For example, the end user network devices 110 can communicate with NFC-enabled merchant point of sale ("POS") devices, ticketing devices, security devices, and other end user network devices 110.

The host CPU 114 executes applications stored on the end user network device 110. For example, the host CPU 114 may execute applications that interact with the NFC controller 112, such as NFC payment applications that enable the user operating the end user network device 110 to complete purchases via an NFC-enabled POS or a transit or event ticketing application that enables the user to enter a transit facility or event via an NFC-enabled ticketing POS. Other applications, including identification, authentication, security, and coupon clipping and redemption applications, also may be stored on the end user network device 110 for execution by the host CPU 114 in connection with the NFC controller 112 and the NFC antenna 113.

Each of the applications may be provided by a respective application provider 180. For example, a credit card company may provide a credit card payment application; a transit or other ticketing company may provide a ticket purchasing and redemption application; a manufacturer, retailer, or other entity that sells products or services may provide a coupon application; and an authentication company may provide a user authentication application.

NFC applications are typically stored in the secure element 111 of the end user network device 110 for security purposes. The secure element 111 provides a secure operating environment for the NFC (or other) applications. The secure element 111 typically includes its own operating environment with tamper-proof microprocessor, operating system, and memory for storing information, such as payment credentials. The secure element 111 may exist within a fixed chip of the end user network device 110, a Subscriber Identification Module ("SIM") card, a Universal Integrated Circuit Card ("UICC"), a removable smart chip, or in a memory card, such as a microSD card. The secure element 111 also may include a memory controller for managing Read Only Memory ("ROM"), Ready Access Memory ("RAM"), and EEPROM flash memory of the card or chip in which the secure element 111 is installed.

In general, the secure service providers 160 serve as intermediaries that assist application providers 180 and other service providers in securely distributing and managing applications and services, such as NFC contactless applications services. A TSM 170 of the secure service provider 160 typically hosts the applications and installs and provisions the applications onto the secure element 111. As shown in FIG. 1, each TSM 170 can receive, store, and utilize the keys 120 for users' secure elements 111. By having the keys 120, the TSM 170 can access the secure elements 111 via a secure encrypted communication channel to install, provision, and customize applications within the secure elements 111. Exemplary secure services providers 160 include GEMALTO and FIRST DATA.

In certain exemplary embodiments, the secure service providers 160 bypass the host CPU 114 and the NFC controller 112 when communicating with the secure element 111. For example, in certain UICC/SIM secure elements, the secure service providers 160 communicate with the secure element 111 via a radio CPU (not shown) installed on the end user network device 110. Thus, the involvement of the NFC controller 112 and the host CPU 114 may be optional during the provisioning of applications on the secure element 111 in certain exemplary embodiments. In certain exemplary embodiments, the host CPU 114 and the radio CPU interact with one another to coordinate access controls to the secure element 111.

The key escrow service 150 maintains the keys 120 for the secure elements 111. The key escrow service 150 also distributes the keys to the TSMs 170, for example in response to a user selection. For instance, if a user elects to switch from a first secure service provider 160A to a second secure service provider 160B, the key escrow service 150 revokes the keys 120 from the first TSM 170A and provides the keys 120 to the second TSM 170B. The second TSM 170 can then access the secure element 111 of the user's network device 110.

The SPS 115 is implemented in software and/or hardware and enables the user of the end user network device 110 to select or change secure service providers 160 via the key escrow service 150. The SPS 115 provides a user interface that allows the user to make a selection of a secure service provider 160. In response to a user selection, the SPS 115 transmits information regarding the selected secure service provider 160 to the key escrow service 150. The key escrow service 150 also can confirm the selection via one or more off-path mechanisms. The SPS 115, key escrow service 150, and other components of the exemplary system 100 are described in more detail hereinafter with reference to the method depicted in FIG. 2.

Figure 3:
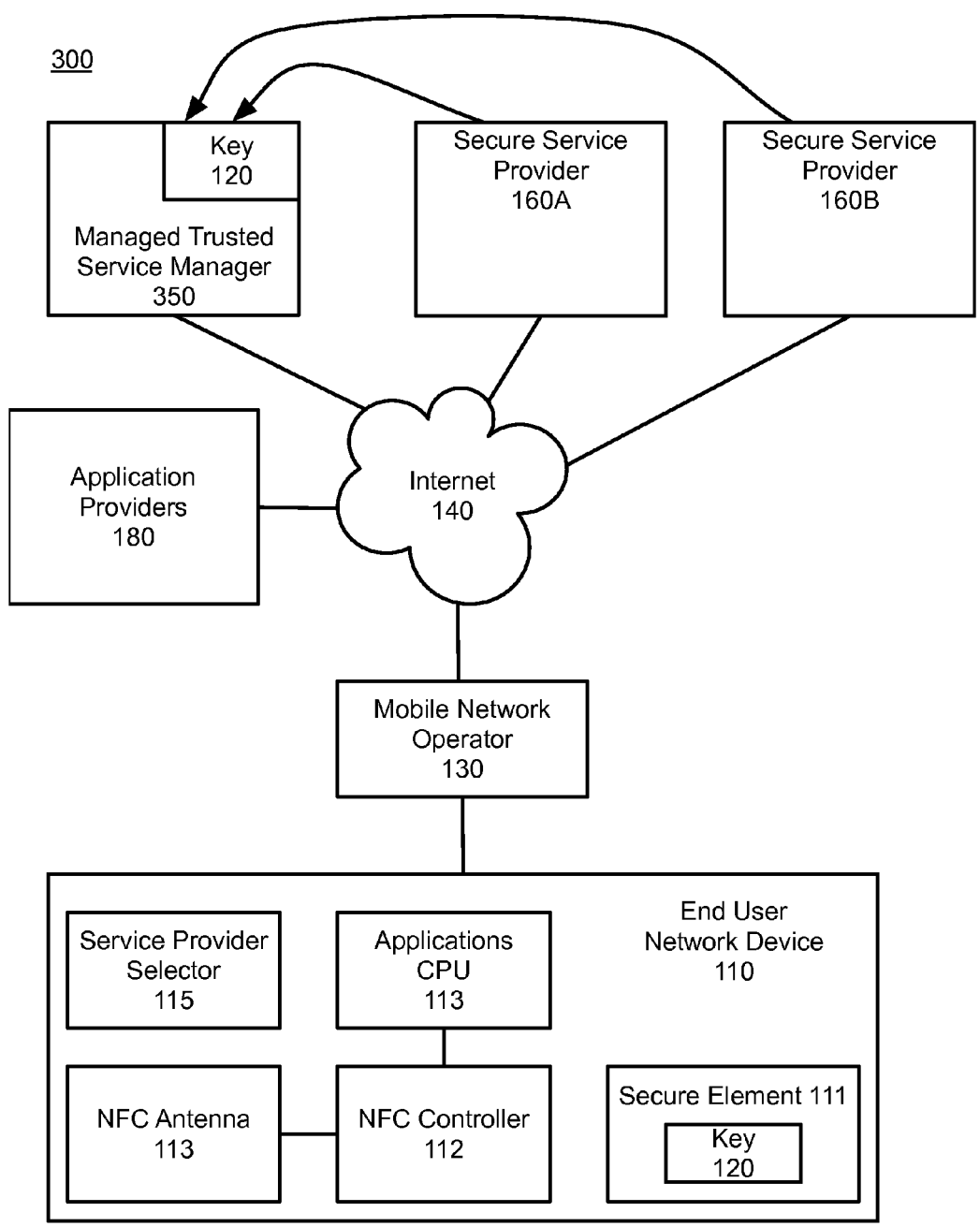
FIG. 3 depicts another NFC system, in accordance with certain exemplary embodiments.

FIG. 3 depicts another NFC system 300, in accordance with certain alternative exemplary embodiments. The exemplary system 300 includes many of the same components as the system 100, including one or more end user network devices 110, one or more application providers 180, an MNO 130, and multiple secure service providers 160. However, rather than a key escrow service 150, the system 300 includes a central managed TSM 350. The managed TSM 350 includes a network device configured to communicate with the Internet 140, such as a server, desktop computer, laptop computer, tablet computer, smartphone, handheld computer, PDA, or other wired or wireless, processor-driven device. Similar to the key escrow service 150, the managed TSM 350 maintains the keys 120 for the secure elements 111 and enables the users operating the end user network devices 110 to select from multiple secure service providers 160. Rather than distributing the keys 120 to the selected TSMs 170, the managed TSM 350 can interact with the secure elements 111 on behalf of the selected secure service provider 160. That is, the managed TSM 350 can install, provision, and interact with applications installed on the secure elements 111. Or, the managed TSM 170 can establish (and terminate) a secure communication channel between the selected TSM 170 and the secure element 111 such that the selected TSM 170 can interact with the secure element 111. This secure communication channel may be encrypted with a different key that is not associated with the secure element 111, and may be specific to each secure service provider 160. The managed TSM 350 also can perform business logic on behalf of the secure service providers 160. The managed TSM 350 and other components of FIG. 3 are described in more detail hereinafter with reference to the method depicted in FIG. 4.

Figure 5:
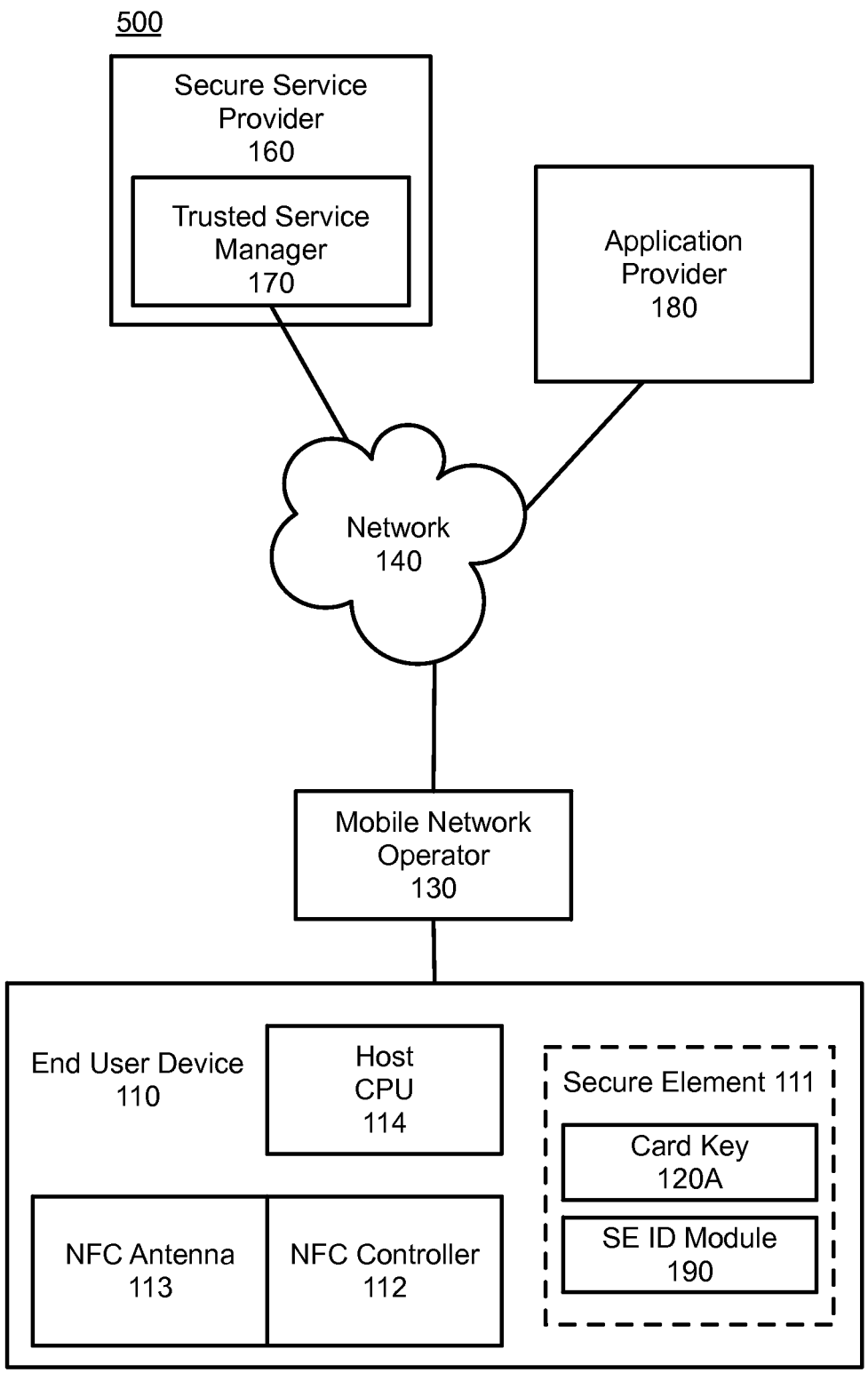
FIG. 5 depicts an operating environment for a secure end user device, in accordance with certain exemplary embodiments.

FIG. 5 depicts an operating environment 500 for a secure end user device 110, in accordance with certain exemplary embodiments. As depicted in FIG. 5, the operating environment 500 includes one or more end user devices 110, one or more application providers 180, a mobile network operator ("MNO") 130, and one or more secure service providers 160. Each of the application providers 180 and secure service providers 160 include a network device configured to communicate via the network 140. For example, each of the application providers 180 and secure service providers 160 may include a server, desktop computer, laptop computer, tablet computer, smartphone, handheld computer, personal digital assistant ("PDA"), or any other wired or wireless, processor-driven device.

The end user devices 110 may be mobile phones, smart phones, PDAs, netbook computers, laptop computers, tablet computers, or any other wired or wireless, processor-driven devices. End user devices 110 can access the network 140 via the MNO 130. Exemplary MNOs 130 include VERIZON, SPRINT, and AT&T. These MNOs 130 may provide access to the network 140 for the end user devices 110. The network 140 may be a wired, wireless, optical, radio frequency, mobile, cellular, any other data or voice network, or any combination thereof. For example, the network 140 may be an internet or the Internet. The MNO 130 may provide connectivity for part of the network 140 as a 3G or 4G mobile communication network. Of course, the end user network devices 110 can access the Internet 140 via other mechanisms, such as Wi-Fi or Wi-Max or in connection with an Internet provider.

The end user devices 110 each include a secure element 111 having a secure element ("SE") identity ("ID") module 190 and one or more card keys 120A. The end user devices 110 may also each include an NFC controller 112, an NFC antenna 113, and a host CPU 114. The NFC controller 112 and the NFC antenna 113 enable the end user device 110 to communicate with other NFC-enabled devices (not shown). For example, the end user devices 110 can communicate with NFC-enabled merchant point of sale ("POS") devices, ticketing devices, security devices, and other end user devices 110.

The card keys 120A may include any keys used to secure applications or processes of the secure element 111. According to various embodiments, the card keys 120A may include card manager keys, fare keys, financial transaction keys, banking keys, or so forth. The card keys 120A may be associated with, shared with, or split with the secure service provider 160, trusted service manager 170, application provider 180, or any other entity or system securely interfacing with the end user device 110 and its secure element 111. The card keys 120A may operate in conjunction with, or be protected by, other keys associated with the SE ID module 190 as discussed in further detail below.

The host CPU 114 can execute applications stored on the end user network device 110. For example, the host CPU 114 may execute applications that interact with the NFC controller 112, such as NFC payment applications that enable the user operating the end user device 110 to complete purchases via an NFC-enabled POS or a transit or event ticketing application that enables the user to enter a transit facility or event via an NFC-enabled ticketing POS. Other applications, including identification, authentication, security, and coupon clipping and redemption applications, also may be stored on the end user device 110 for execution by the host CPU 114 in connection with the NFC controller 112 and the NFC antenna 113.

Applications associated with an end user device 110 may also be associated with an application provider 180. For example, a credit card company may provide a credit card payment application; a transit or other ticketing company may provide a ticket purchasing and redemption application; a manufacturer, retailer, or other entity that sells products or services may provide a coupon application; and an authentication company may provide a user authentication application.

NFC applications are typically stored in the secure element 111 of the end user device 110 for security purposes. The secure element 111 provides a secure operating environment for the NFC (or other) applications. The secure element 111 typically includes its own operating environment with tamper-proof microprocessor, operating system, and memory for storing information, such as payment credentials. The secure element 111 may exist within a fixed chip of the end user device 110, a Subscriber Identification Module ("SIM") card, a Universal Integrated Circuit Card ("UICC"), a removable smart chip, or in a memory card, such as a microSD card. The secure element 111 also may include a memory controller for managing Read Only Memory ("ROM"), Ready Access Memory ("RAM"), and EEPROM flash memory of the card or chip in which the secure element 111 is installed.

In general, the secure service providers 160 serve as intermediaries that assist application providers 180 and other service providers in securely distributing and managing applications and services, such as NFC contactless applications services. A TSM 170 of the secure service provider 160 typically hosts the applications and installs and provisions the applications onto the secure element 111. Each TSM 170 can receive, store, and utilize the card keys 120A for associated secure elements 111. The TSM 170 can access the secure element 111 using the card keys 120A for that secure element. Exemplary secure service providers 160 include GEMALTO and FIRST DATA.

In certain exemplary embodiments, the secure service providers 160 bypass the host CPU 114 and the NFC controller 112 when communicating with the secure element 111. For example, in certain UICC/SIM secure elements, the secure service providers 160 communicate with the secure element 111 via a radio CPU (not shown) installed on the end user device 110. Thus, the involvement of the NFC controller 112 and the host CPU 114 may be optional during the provisioning of applications on the secure element 111 in certain exemplary embodiments. In certain exemplary embodiments, the host CPU 114 and the radio CPU interact with one another to coordinate access controls to the secure element 111.

The user of the end user device 110 may wish to delete or reset security features associated with the secure element 111 such as card keys 120A. For example, the user may wish to dissociate the end user device 110 from the secure service provider 160 so that they can securely transfer the end user device 110 to another user. Similarly, the user may wish to dissociate the end user device 110 from one secure service provider 160 to allow associating with another provider. For example, if the user wishes to change the financial institution associated with NFC payments or fund transfers made with the end user device 110. Talk about reset/deletion of keys. The SE ID Module 190 can support a secure deletion or reset process for the secure element 111 as discussed in further detail below.

Figure 6:
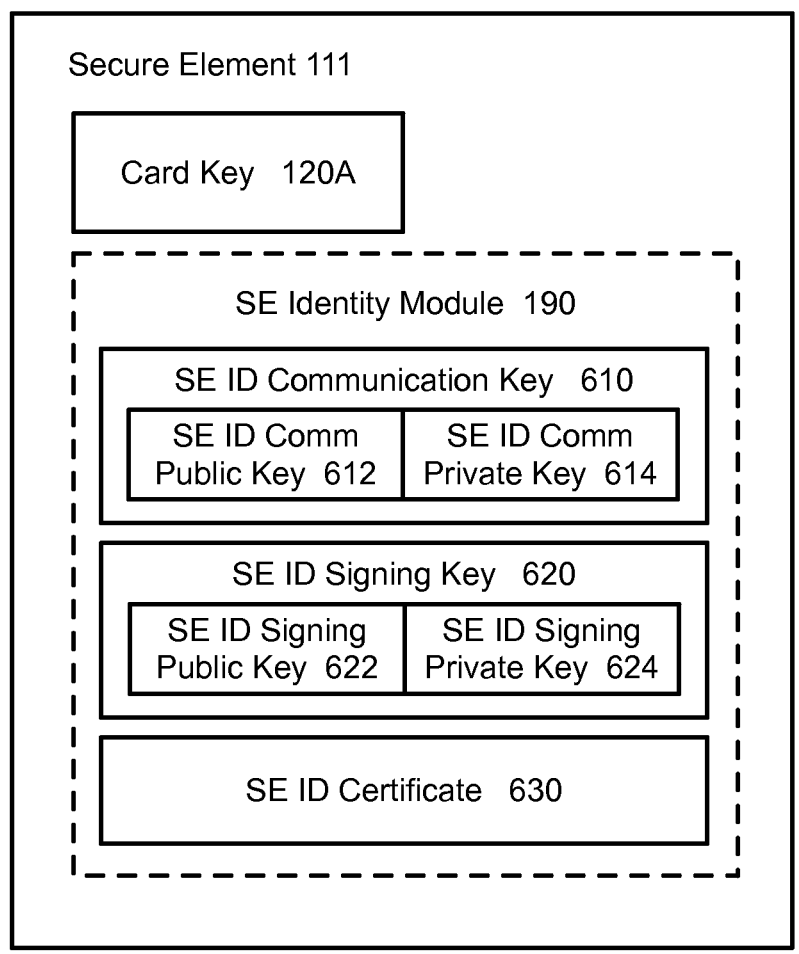
FIG. 6 depicts a secure element from an end user device, in accordance with certain exemplary embodiments.

FIG. 6 depicts a secure element 111 from an end user device 110, in accordance with certain exemplary embodiments. As depicted in FIG. 6, the secure element 111 can include a card key 120A and a secure element identity module 190. The secure element identity module 190 can include a secure element identity communication key 610, a secure element identity signing key 620, and a secure element identity certificate 630. The secure element identity module 190 may be used to verify that an application or service is interacting with a particular secure element 111 and also secure messages sent to and from the secure element 111. For example, element identity communication key 610 may be used to encrypt communications with the secure element 111 so that those communications may only be transacted by the intended secure element 111. Similarly, the secure element identity signing key 620 may be used verify which secure element 111 is being communicated with. These mechanisms may be used, as discussed below to securely reset the secure element 111 such as clearing or resetting card keys 120A. The secure element identity certificate 630 may be used to certify exchange and transfer of the various keys such as the secure element identity communication key 610 and the secure element identity signing key 620.

The secure element identity communication key 610 and the secure element identity signing key 620 may operate in a key split or public/private key pair configurations. For example, the secure element identity communication key 610 may comprise a public key 612 and a private key 614. Similarly, the secure element identity signing key 620 may comprise a public key 622 and a private key 624.

The secure element identity module 190 may provide secure identification functionality. Such functionally may include features provided by, or in association with, the secure element 111 in order to support secure element 111 reset procedures as discussed in further detail below. One such feature involves supporting secure communications and secure authentication with the secure element identity module 190 from a secure application, application provider 180, or a secure service provider 160. Another feature involves supporting a reset operation in association with the secure element identity module 190. The reset operation may atomically clear the secure element 111. This may include clearing or resetting one or more card keys 120A from the secure element 111. The atomic nature of the reset operation may provide a reset that is all or nothing in nature and cannot be operationally subdivided or partially carried out. Another feature may include a mechanism for verifying that the reset operation originates from a trusted source. For example, the verification may ensure that the reset is actually being done on behalf of the owner of the end user device 110 or some other approved individual, provider, or application. These features of the secure element identity module 190 may also be associated with an operating system, a smart-card operating system, or an applet such as a card manager applet.

System Process

Figure 2:
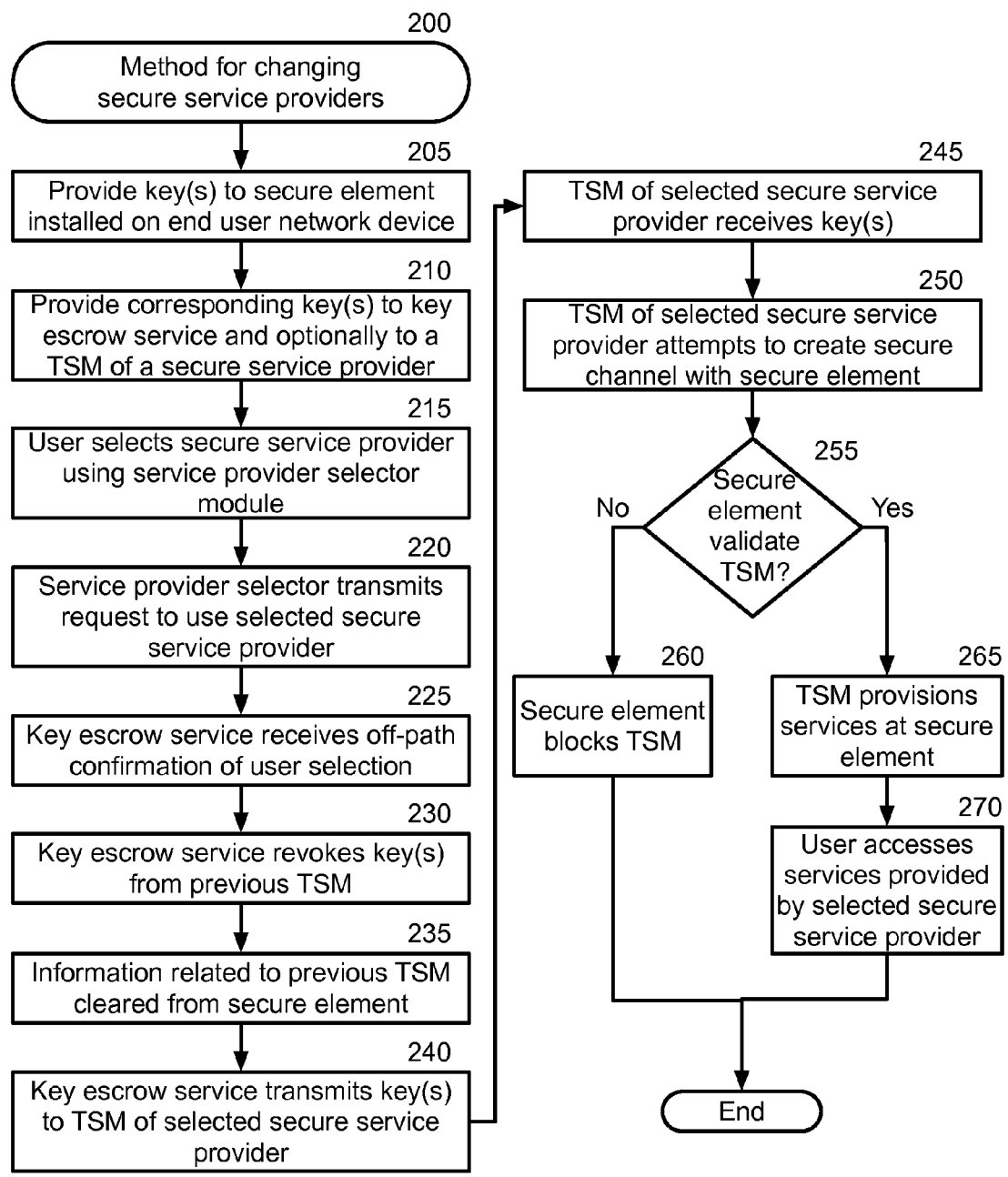
FIG. 2 is a block flow diagram depicting a method for changing secure service providers in the NFC system of FIG. 1, in accordance with certain exemplary embodiments.

FIG. 2 is a block flow diagram depicting a method 200 for changing secure service providers in the NFC system 100 of FIG. 1. The method 200 is described with reference to the components illustrated in FIG. 1.

In block 205, one or more secure cryptographic keys 120 are provided for a secure element 111. In certain exemplary embodiments, the secure element 111 and its keys 120 are installed on an end user network device 110 at manufacture time. In certain exemplary embodiments, the secure element 111 and its keys 120 are installed on a removable card or chip, such as a SIM card or microSD card, that is later installed on the end user network device 110.

In block 210, the keys 120 for the secure element 111 or corresponding keys are provided to the key escrow service 150. These keys 120 enable the key escrow service 150 (or another entity that receives the keys 120) to create a secure communication channel with, and gain access to, the secure element 111. Optionally, the keys 120 also are provided to a TSM 170 of a secure service provider 160. Conventionally, the secure service provider 160 and the TSM 170 for the secure element 111 are selected by the manufacturer of the end user network device 110, typically under guidance from the MNO 130 that purchases the end user network device 110. In this case, the keys 120 may be provided to that TSM 170. Alternatively, the keys 120 are provided to the key escrow service 150 only. In this case, the user operating the end user network device 110 (or another entity, such as the MNO 130) can make an initial selection of secure service providers 160 using the SPS 115.

In block 215, the user selects a secure service provider 160 and thus, a TSM 170, using the SPS 115. For example, the user may access the SPS 115 using the end user network device 110. The SPS 115 may present a user interface that lists available secure service providers 160 and optionally the services supported by the secure service providers 160. For example, the SPS 115 may display financial institutions for which contactless transactions are supported by each secure service provider 160. In another example, the SPS 115 may display applications provisioned and supported by each available secure service provider 160. In yet another example, the SPS 115 may provide a search function that enables users to search secure service providers 160 based on their features and services. When the user finds an appropriate secure service provider 160, the user can select that secure service provider 160 using the SPS 115.

In block 220, the SPS 115 transmits a request to use the selected service provider 160 to the key escrow service 150 in response to the user selection. The request typically includes information identifying the selected secure service provider 160. In response to receiving the request, the key escrow service 150 processes the request.

In block 225, the key escrow service 150 performs an off-path confirmation procedure to confirm that the user initiated the request to use the selected secure service provider 160. This block 225 is optional and provides an additional level of security for the SPS 115/key escrow service 150 system for example to prevent another person from accessing this feature in the event that the end user network device 110 is lost or stolen.

In one embodiment, the off-path confirmation procedure includes the key escrow service 150 communicating to the user that the request was made via a different communication channel than through the end user network device 110. For example, the key escrow service 150 may transmit an SMS text message to a mobile phone of the user that indicates that the request was made. Or, key escrow service 150 may make a telephone call to the user with a message that the request was made. The text message or voice message may instruct the user to call a certain telephone number if the user did not make the request. The key escrow service 150 also may require that the user confirm the request. For example, the text message may instruct the user to respond to the text message, access a web site of the key escrow service 150, or call the key escrow service 150 to confirm the request. Also, a code may be provided in the message to the user and the user may be required to enter the code via phone or via the web site to confirm the request.

In block 230, if another TSM 170 possessed the keys 120 for the secure element 115, the key escrow service 150 revokes the keys 120 from that previous TSM 170. In one embodiment, the key escrow service 150 sends a message, for example an SMS text message, to the previous TSM 170 requesting that the TSM discard the keys 120. The secure service providers 160 may be obligated under contract to discard the keys 120 in response to such a request.

In another embodiment, the key escrow service 150 revokes the keys 120 from the previous TSM 170 by instructing the secure element 111 to block the previous TSM 170. The secure element 111 can include program code that identifies TSMs 170 attempting to access the secure element 111 and a list of allowed and/or blocked TSMs 170. When a TSM 170 attempts to access the secure element 111, the secure element 111 can compare information identifying that TSM 170 to the list(s) to determine whether to grant access. The key escrow service 150 also can send a request to the previous TSM 170 requesting that the previous TSM discard the keys 120. Of course, the blocked TSM 170 can be unblocked in the event that the user reselects the secure service provider 160 for that TSM 160. For example, the key escrow service 150 may send a message to the secure element 111 requesting that the secure element 110 unblock the TSM 170.

In yet another embodiment, the key escrow service 150 revokes the keys 120 from the previous TSM 170 via the use of a master key and TSM specific keys. A TSM specific key may be provided to the secure element 111 for each available TSM or for a selected TSM 170. The TSM specific keys also are distributed to the respective TSMs 170. The TSM specific keys may be preloaded onto the secure element 111 at manufacture time, installed at a later date by the key escrow service 150, or installed by the key escrow service 150 in response to the user selecting a TSM 170. The secure element 111 can control which of the TSM specific keys are active and which TSM specific keys are inactive. For example, if a user requests to switch from secure service provider 160A to secure service provider 160B, the SPS 115 communicates this request (and information identifying the selected TSM 170B) to a key management applet or module (not shown) of the secure element 111. The key management applet activates the TSM specific key for the TSM 170B and deactivates the TSM specific key for the TSM 170A in response to the request. At this point, the secure element 111 allows access to the TSM 170B while blocking access from the TSM 170A.

In block 235, information stored on the secure element 111 related to the previous TSM 170 and/or previous secure service provider 160 is removed from the secure element 111. For example, payment card credentials associated with the previous TSM 170 may be stored on the secure element 111 while that TSM 170 is being used in conjunction with the secure element 111. These credentials are removed from the secure element 111 prior to enabling another TSM 170 access to the secure element 111. In addition, any applications installed on the secure element 111 for the previous TSM 170 are uninstalled. In certain exemplary embodiments, the key escrow service 150 sends a command to an applet or module of the secure element 111, such as a card manager applet, to remove the information related to the previous TSM 170.

In block 240, the key escrow service 150 transmits the keys 120 to the TSM 170 of the selected secure service provider 160. This transmission is typically made via a secure communication channel. For example, the key escrow service 150 may send the keys 120 to the selected TSM 170 via an encrypted communication channel. In block 245, the selected TSM 170 receives the keys 120.

In certain exemplary embodiments, the key escrow service 150 delays transmitting the keys 120 to the TSM 170 of the selected secure service provider 160 until receiving confirmation that the information and applications related to the previous TSM 170 are removed from the secure element 111. In some embodiments, the key escrow service 150 may not transmit the keys 120 to the TSM 170 of the selected secure service provider 160 without receiving off-path confirmation from the user that the user requested to use the selected secure service provider 160.

In block 250, the TSM 170 of the selected secure service provider 160 attempts to create a secure communication channel with the secure element 111 using the received keys 120. In one embodiment, the TSM 170 sends an encrypted message to the secure element 111 requesting access to the secure element 111. The TSM 170 encrypts the message by performing a cryptographic algorithm on the message using the received keys 120.

In block 255, the secure element 111 determines whether to grant access to the TSM 170. In one embodiment, the processor of the secure element 111 performs a cryptographic algorithm on the received message using the keys 120 stored on the secure element 111 to determine whether to grant access to the TSM 170.

In certain exemplary embodiments, the SPS 115 makes an initial determination as to whether to grant access to a TSM 170 prior to the secure element 111 validating the TSM 170. For example, when the end user network device 110 receives a request for access to the secure element 111, the SPS 115 may evaluate the request to determine whether the TSM 170 that issued the request is the TSM 170 that the user selected prior to the request being passed to the secure element 111. If the SPS 115 determines that the TSM 170 that issued the request is the selected TSM 170, then the secure element 111 may validate the request in accordance with the acts of block 255.

If the secure element 111 grants access to the TSM 170, the method 200 follows the "Yes" branch to block 265. Otherwise, if the secure element 111 determines that the TSM 170 should be blocked, the method 200 follows the "No" branch to block 260.

In block 260, the secure elements 111 blocks the TSM 170 from accessing the secure element 111. The secure element 111 also may send a message to the TSM 170 to notify the TSM 170 that the TSM 170 was not granted access.

In block 265 the TSM 170 provisions services at the secure element 111. The TSM 170 may transmit to the secure element 111 one or more applications and credentials for use with those applications. The applications may be selected by the user. For example, the user may request an application from an application provider 180. In response, the application provider 180 requests the TSM 170 to install the application onto the secure element 111 of the user. The application provider 180 also may provide information regarding the user or account information of the user to the TSM 170 for storing at the secure element 111. For example, a credit card company may provide a payment application and information regarding a payment account of the user to the TSM 170 for installing/storing on the secure element 111. In certain exemplary embodiments, the user may request the application from the key escrow service 150 or the secure service provider 160.

In block 270, the user accesses services provided by the selected secure service provider 160 in connection with one or more application providers 180. For example, if the application provider 180 is a credit card company, the user may complete purchases using the end user network device 110 at an NFC-enabled POS. The NFC controller 112 may interact securely with the secure element 111 to obtain payment credentials from the secure element 111 and provide those credentials to the NFC-enabled POS via the NFC antenna 113.

After block 270, the method 200 ends. Of course, the user can continue to access services provided by the selected secure service provider 160 or switch to another secure service provider 160.

Figure 4:
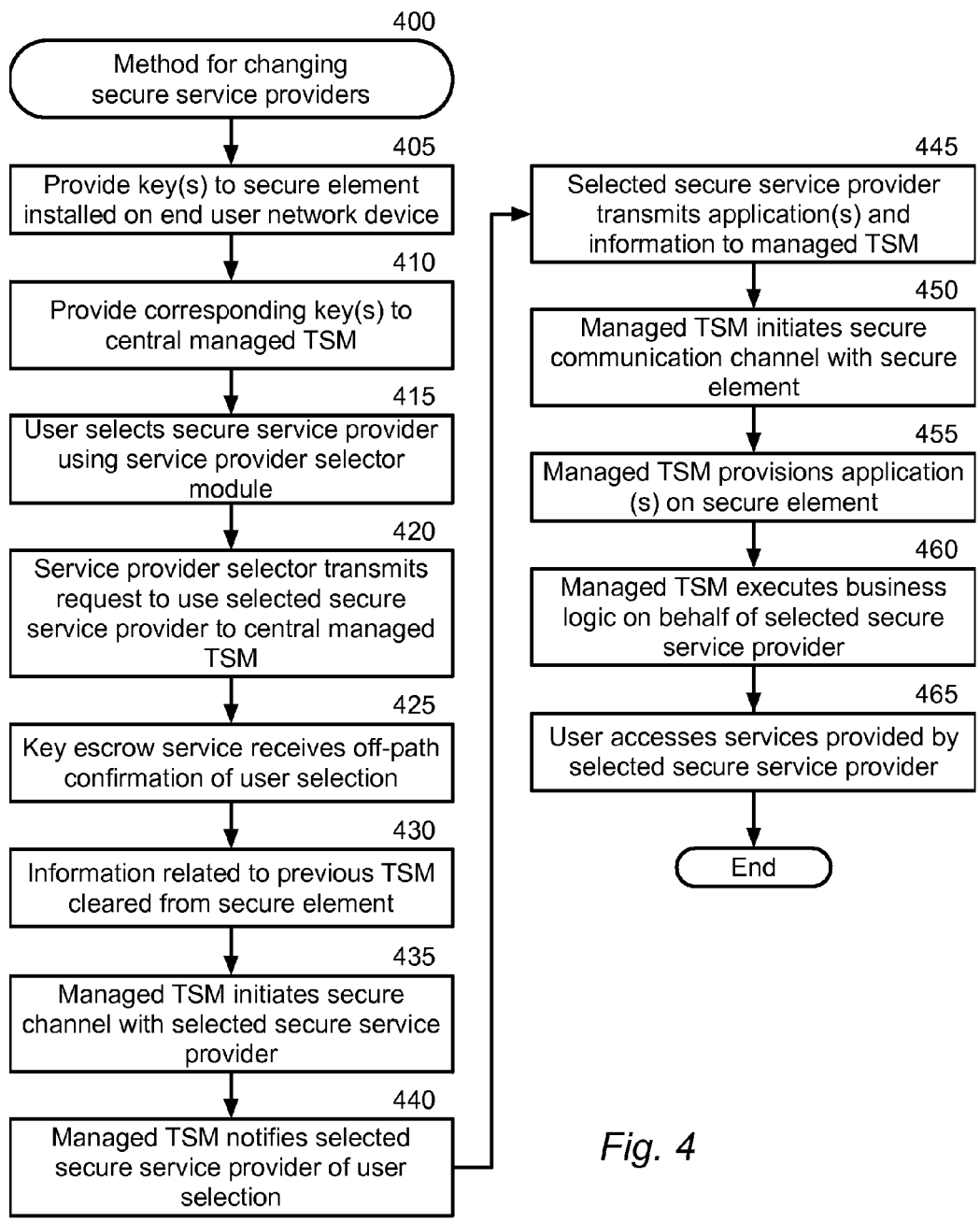
FIG. 4 is a block flow diagram depicting a method for changing secure service providers in the NFC system of FIG. 3, in accordance with certain exemplary embodiments.

FIG. 4 is a block flow diagram depicting a method 400 for changing secure service providers in the NFC system 300 of FIG. 3, in accordance with certain exemplary embodiments. The method 400 is described with reference to the components illustrated in FIG. 3.

In block 405, one or more secure cryptographic keys 120 are provided for a secure element 111. In certain exemplary embodiments, the secure element 111 and its keys 120 are installed on an end user network device 110 at manufacture time. In certain exemplary embodiments, the secure element 111 and its keys 120 are installed on a removable card or chip, such as a SIM card or microSD card, that is later installed on the end user network device 110.

In block 410, the keys 120 for the secure element 111 or corresponding keys are provided to the managed TSM 350. These keys 120 enable the managed TSM 350 (or another entity that receives the keys 120) to create a secure communication channel with and gain access to the secure element 111.

In block 415, the user selects a secure service provider 160 using the SPS 115. This block 415 can be the same as or similar to block 215 illustrated in FIG. 2 and described above. In block 420, the SPS 115 transmits a request to use the selected service provider 160 to the managed TSM 350 in response to the user selection. The request typically includes information identifying the selected secure service provider 160. In response to receiving the request, the managed TSM 350 processes the request.

In block 425, the managed TSM 350 performs an off-path confirmation procedure to confirm that the user initiated the request to use the selected secure service provider 160. This block is optional and is substantially similar to block 225 of FIG. 2 described above. However, the managed TSM 350 performs the off-path confirmation in block 425 rather than the key escrow service 150.

In block 430, information stored on the secure element 111 related to the previous TSM 170 and/or previous secure service provider 160 is removed from the secure element 111. For example, payment card credentials associated with the previous TSM 170 may be stored on the secure element 111 while that TSM 170 is being used in conjunction with the secure element 111. These credentials are removed from the secure element 111 prior to enabling another TSM 170 access to the secure element 111. In addition, any applications installed on the secure element 111 for the previous TSM 170 are uninstalled. In certain exemplary embodiments, the managed TSM 350 sends a command to an applet or module of the secure element 111, such as a card manager applet, to remove the information related to the previous TSM 170.

In block 435, the managed TSM 350 creates a secure communication channel with the secure service provider 160 that the user selected. This secure communication channel may be encrypted, for example using one or more cryptographic keys different than the keys 120. Other encryption techniques may be used as would be appreciated by one of ordinary skill in the art having the benefit of the present disclosure.

In block 440, the managed TSM 350 notifies the selected secure service provider 160 that the user has request to access the services of that secure service provider 160. The managed TSM 350 also may request one or more applications from the secure service provider 160 on behalf of the user. Or, the user may request the one or more applications from the application provider 180 and the application provider 180, in turn, transmits a request to the secure service provider 160 to provide the one or more applications to the user's secure element 111. In block 445, the selected secure service provider 160 transmits the requested application(s) and any other appropriate information to the managed TSM 350. For example, this other appropriate information may include credential for accessing the secure service, such as payment card credentials.

In block 450, the managed TSM 350 creates a secure communication channel with the secure element 111 using the one or more keys 120. In block 455, the managed TSM 350 provisions services at the secure element 111. The managed TSM 350 may transmit to the secure element 111 one or more applications and credentials for use with those applications. The managed TSM 350 also may provide information regarding the user or an account of the user to the secure element 111. For example, a credit card company may provide a payment application and information regarding a payment account of the user to the managed TSM 350 for installing/storing on the secure element 111.

In block 460, which is optional, the managed TSM 350 executes business logic for the selected secure service provider 160 and serves as a proxy or intermediary between the selected secure service provider 160. Examples of business logic performed by the managed TSM 350 includes validating whether a user has a payment card with a partnered financial institution, validating credit card credentials provided by a user so that the credit card can be provisioned to the secure element 111, validating whether the selected secure service provider 160 provides a requested service for the given end user network device 150 on the MNO 130 that the end user network device 150 communicates with, and receiving a provisioning request from the user and translating the provisioning instructions for the secure element 111.

In block 465, the user accesses services provided by the selected secure service provider 160 in connection with one or more application providers 180. For example, if the application provider 180 is a credit card company, the user may redeem transit tickets using the end user network device 110 at an NFC-enabled POS. The NFC controller 112 may interact securely with the secure element 111 to obtain transit ticket credentials from the secure element 111 and provide those credentials to the NFC-enabled POS via the NFC antenna 113.

After block 465, the method 400 ends. Of course, the user can continue to access services provided by the selected secure service provider 160 or switch to another secure service provider 160.

Figure 7:
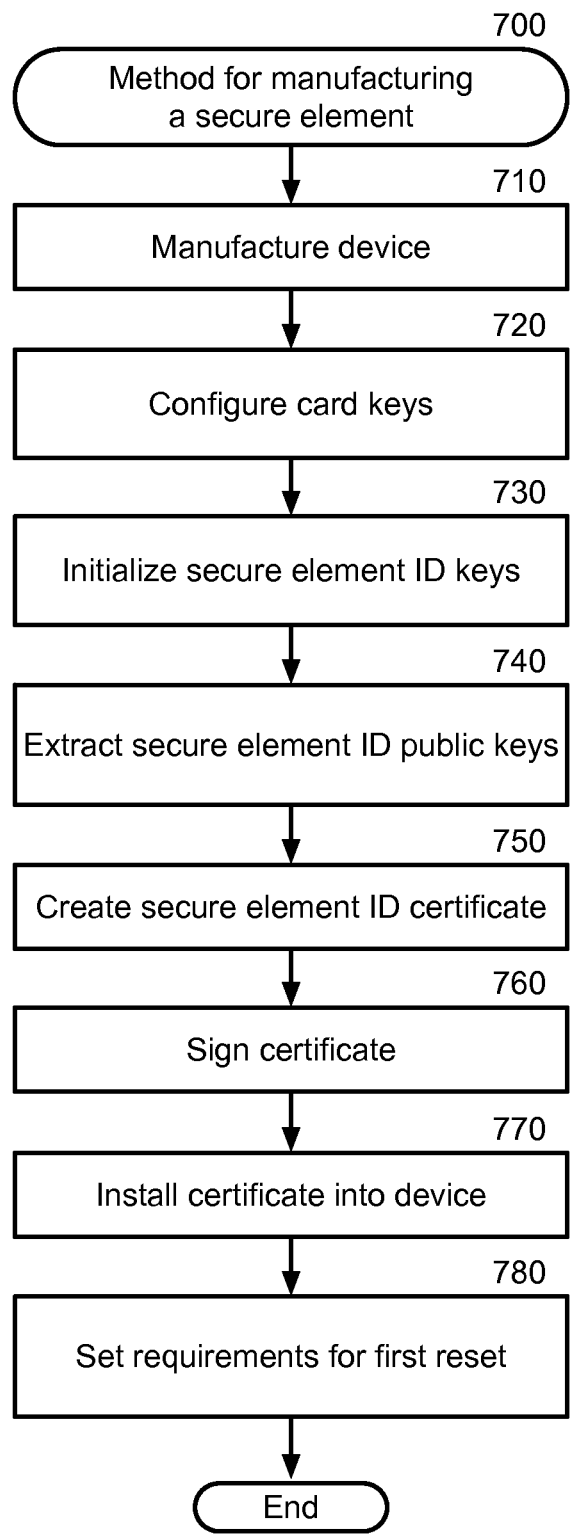
FIG. 7 is a block flow diagram depicting a method for manufacturing a secure element, in accordance with certain exemplary embodiments.

FIG. 7 is a block flow diagram depicting a method 700 for manufacturing a secure element 111 in accordance with certain exemplary embodiments. The method 700 is described with reference to the components illustrated in FIGS. 5 and 6.

In block 710, hardware for the end user device 110 may be manufactured. Manufacturing the end user device 110 may include manufacturing the secure element 111. Alternatively, a previously manufactured secure element 111 may be incorporated into or associated with the end user device 110.

In block 720, initial card keys 120A for the secure element 111 discussed in hardware manufacturing black 610 may be configured. The card keys 120A may be configured with initial keys ready for use or keys that are merely place holders. One or more of the card keys 120A may remain open or uninitialized for future installation.

In block 730, keys associated with the secure element identity module 190 may be initialized. These keys may include the secure element identity communication key 610 and the secure element identity signing key 620. Initializing the secure element identity communication key 610 may comprise creating a public key 612 and a private key 614. Similarly, initializing the secure element identity signing key 620 may comprise creating a public key 622 and a private key 624. These keys may be used by, or in association with, the secure element identity module 190 for signing to show the authenticity of messages and for encrypted and decrypting to protect messages.

In block 740, public keys may be extracted from the secure element identity keys created in block 730. For example, the public key 612 may be extracted from the secure element identity communication key 610. Similarly, the public key 622 may be extracted from the secure element identity signing key 620. These public keys may be used by other systems to sign or encrypt messages that may then be received or verified at the secure element identity module 190 using the associated private keys.

In block 750, a secure element identity certificate 630 may be created for the secure element 111 discussed in block 310. The secure element identity certificate 630 may include the public keys extracted in block 740. The secure element identity certificate 630 may be used to authentic the secure element identity module 190. The secure element identity certificate 630 may also be used to establish secure communications with the secure element identity module 190. These features may be supported though use of the public keys placed within the secure element identity certificate 630.

In block 760, the secure element identity certificate 630 may be signed with a key such as the manufacturer's private key. Prior to use of the secure element identity certificate 630, this signature may be verified to ensure that the secure element identity certificate 630 is authentic and correct.

In block 770, the secure element identity certificate 630 may be installed into the end user device 110. The secure element identity certificate 630 may be installed within, or in association with, the secure element identity module 190 within the secure element 111 of the end user device 110.

In block 780, initial requirements for the first reset operation may be set within the secure element identity module 190. These requirements may include the type of authorization for use in the first reset operation as discussed below with respect to block 870 of method 800. For example, the first reset operation may require having been signed by a specified key available within the secure element identity certificate 630 or some other key.

After block 780, the method 700 ends. Of course, additional secure elements may continue to be manufactured according to the method 700.

Figure 8:
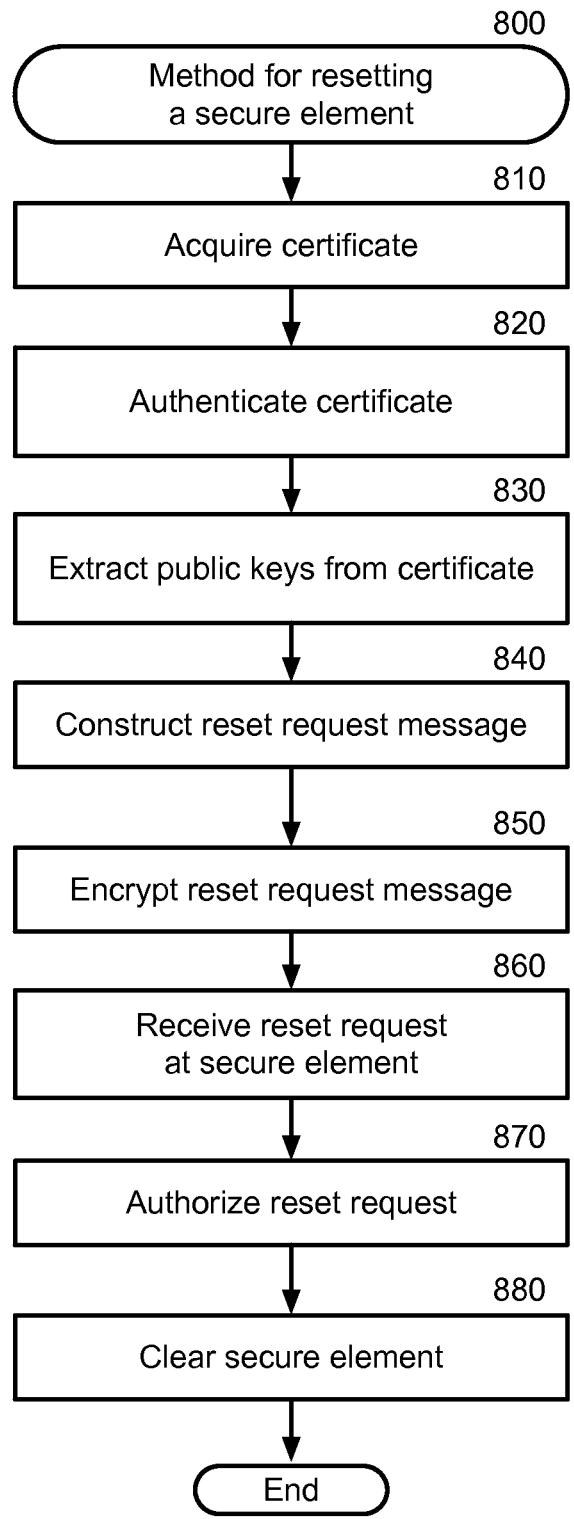
FIG. 8 is a block flow diagram depicting a method for resetting a secure element, in accordance with certain exemplary embodiments.

FIG. 8 is a block flow diagram depicting a method 800 for resetting a secure element 111 in accordance with certain exemplary embodiments. The method 800 is described with reference to the components illustrated in FIGS. 5 and 6.

In block 810, the secure element identity certificate 630 may be acquired from the secure element 111. The secure element identity certificate 630 may be requested from the secure element 111 and the secure element 111 may respond with the secure element identity certificate 630 that is stored within the secure element 111.

In block 820, the secure element identity certificate 630 acquired in block 810 may be authenticated. A signature applied to the secure element identity certificate 630 may be verified to authentic the secure element identity certificate 630. The signature may be based on a key associated with the manufacturer of the secure element 111 or the end user device 110.

In block 830, public keys may be extracted from the secure element identity certificate 630 that was authenticated in block 820. A public key for communicating secure messages with the secure element 111 may be the public key 612 originally extracted from the secure element identity communication key 610. Similarly, the public key for signing may be the public key 622 originally extracted from the secure element identity signing key 620. These public keys may be used to sign or encrypt messages that may then be received or verified at the secure element identity module 190 using the associated private keys.

In block 840, a reset request message may be constructed. This message is the reset request that may be sent to the secure element 111 to request that it reset or clear its keys such as card keys 120A. The reset request message may include new key to be installed such as new card manager keys, new fare keys, and so forth. The reset request message may also include authentication information to specify how the reset request is being authenticated as being from an approved individual such as the owner of the end user device 110. The reset request message may also include configuration information. The configuration information may include specifications as to how the next rest will be authenticated or other configuration parameters such as default key patterns for the cleared keys or so forth.

In block 850, the reset request message constructed in block 840 may be encrypted for secure communication. The reset request message may be encrypted using the secure element identity communication key 610. According to such encryption, the secure element identity module 190 may securely receive the reset request message and verify that the message was not sent maliciously, erroneously, or intended for another secure element 111.

In block 860, the reset request message that was constructed in block 840 and encrypted in block 850 may be issued to the secure element 111 of the end user device where the message may be received, verified, and acted upon by the secure element identity module 190.

In block 870, the reset request message received at the secure element 111 in block 860 may be authorized to allow the reset operation to continue. If the secure element 111 allows unrestricted access to the reset operation, an attacker could potentially use this feature to maliciously destroy information on another user's secure element 111. Hence, it is desirable to have some an authorization or confirmation mechanism to protect against unapproved access to the reset operation. Of the various options for providing this authorization protection, a few examples are discussed here.

According to a first example for authenticating reset operations, a well-known or trusted authority may cryptographically sign the reset request message. In this scenario, the secure element identity module 190 may be provided with a public key associated with the well-known authority. This key may be used to verify a signature placed on any reset request message prior to executing the reset request. Accordingly, the entity that owns the corresponding private key is entrusted to verify that the reset request is only issued by legitimate parties.

According to a second example for authenticating reset operations, submitting an authorization code over the contactless interface may be required within the secure element 111 to authorize reset request messages. This protects the user from remote attackers that try to reset their secure element 111, because the reset request message will only execute when the user intentionally enters an authorization code into a reader and sends an associated authorization command to the secure element 111 wirelessly.

According to a third example for authenticating reset operations, reset request messages may require a particular pre-determined physical communication with the end user device 110 or the secure element 111. For example, if there were a trusted operating system on the end user device 110, the trusted operating system could inform the secure element 111 that the reset request had been authorized by trusted user input on the end user device 110. Alternatively, if there were a dedicated security button or input on the end user device 110, the secure element 111 could require that this button or input be pressed or activated before allowing a reset operation to occur. This requirement would be a physical verification that the owner of the end user device 110 or some other authorized individual was intending to reset the secure element 111 and the rest would be less likely to be spoofed from an unauthorized source.

In block 880, the secure element 111 may be cleared or reset. The reset operation may be atomic to ensure that the reset occurs entirely or not at all. The reset operation may reset, delete, or wipe the contents of the secure element 111. The reset operation may include deleting all existing applications, applets, keys, and data. New card keys 120A may be installed as part of the reset operation. This may include removing all applets and execution instances. All security domains may also be removed along with all card manager keys, fare keys, and any other keys or certificates. The reset operation may clear all persistent heap and other memory. The operation may also reset all communications control related data such as secure channel sequence counters, or frequency sets. The reset operation may install new card keys 120A such as card manager keys and may also in saves the configuration information to control the authorization requirements for the next reset.

According to certain embodiments, the keys and certificates associated with the secure element identity module 190 may be exempt from the clearing of the reset operation since these keys and certificates are tied to the specific secure element 111 partly to support reset and initialization.

After block 880, the method 800 ends. Of course, the secure element 111 may continue to receive reset request messages to enable future secure element 111 reset operations within the end user device 110.

General

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for resetting secure memories within computing devices configured to conduct financial transactions, comprising:
    receiving an encrypted reset request message for a secure memory of a computing device configured to conduct financial transactions, the encrypted reset request message being associated with a request to change control of the secure memory from a first secure service provider to a second secure service provider, the encrypted reset request message originating from a source other than the first secure service provider;
    providing a communication key within the secure memory;
    decrypting the encrypted reset request message within the secure memory using the communication key;
    verifying authorization for the reset request message; and
    clearing parameters associated with the first secure service provider from the secure memory based on instructions provided in the verified reset request message that originated from the source other than the first secure service provider.

2. The computer-implemented method of claim 1, further comprising revoking an access key of the first secure service provider to access the secure memory of the computing device in connection with the request to change from the first secure service provider to the second secure service provider.

3. The computer-implemented method of claim 1, further comprising receiving a certificate request and providing a certificate associated with the communication key in response to receiving the certificate request.

4. The computer-implemented method of claim 1, wherein clearing parameters associated with the secure memory comprises resetting one or more card keys of the first secure service provider within the secure memory.

5. The computer-implemented method of claim 1, wherein verifying authorization for the reset request message comprises verifying a signature of the reset request message from a trusted authority.

6. The computer-implemented method of claim 1, wherein verifying authorization for the reset request message comprises receiving an authorization code over a wireless interface.

7. The computer-implemented method of claim 1, wherein the communication key comprises a private public key pair.

8. The computer-implemented method of claim 1, further comprising providing a signing key within the secure memory.

9. The computer-implemented method of claim 1, wherein the secure memory is associated with a Near Field Communication interface.

10. The computer-implemented method of claim 1, wherein clearing parameters associated with the secure memory comprises an atomic operation.

11. The computer-implemented method of claim 1, wherein the secure memory is comprised in a secure element.

12. A computer program product, comprising:
    a non-transitory computer-readable medium having computer-readable program instructions embodied therein that when executed by a computer cause the computer to reset secure memories within computing devices configured to conduct financial transactions, the computer-readable program instructions comprising:
        computer-readable program instructions to receive an encrypted reset request message for a secure memory of a computing device configured to engage in financial transactions, the encrypted reset request message being associated with a request to change control of the secure memory from a first electronic entity to a second electronic entity, the encrypted reset request message originating from a source other than the first electronic entity;
        computer-readable program instructions for storing a communication key within a secure certificate associated with the secure memory of the computing device;
        computer-readable program instructions for decrypting the encrypted reset request message within the secure memory using the communication key;
        computer-readable program instructions for verifying authorization for the reset request message; and
        computer-readable program instructions for clearing parameters associated with the first electronic entity from the secure memory.

13. The computer program product of claim 12, wherein the first electronic entity is a first secure service provider and the second electronic entity is a second secure service provider.

14. The computer program product of claim 13, further comprising computer-readable program instructions to revoke an access key of the first secure service provider to access the secure memory of the computing device in connection with the request to change from the first secure service provider to the second secure service provider.

15. The computer program product of claim 12, wherein clearing parameters associated with the secure memory comprises resetting card keys associated with the secure memory.

16. The computer program product of claim 12, wherein the secure memory is associated with a Near Field Communication interface.

17. The computer program product of claim 12, wherein verifying authorization for the reset request message comprises verifying a signature of the reset request message from a trusted authority.

18. The computer program product of claim 12, wherein verifying authorization for the reset request message comprises receiving an authorization code over a wireless interface.

19. The computer program product of claim 12, wherein verifying authorization for the reset request message comprises receiving an authorization code over a Near Field Communications interface.

20. The computer program product of claim 12, wherein clearing parameters associated with the secure memory comprises an atomic operation.

21. The computer program product of claim 12, wherein the secure certificate comprises a public key for signing a message associated with the secure memory.

22. The computer program product of claim 12, wherein the secure memory is comprised in a secure element.

23. A system for resetting secure memories within computing devices, comprising:

a storage device;

a processor communicatively coupled to the storage device, wherein the processor executes application code instructions that are stored in the storage device to cause the system to:

receive an encrypted reset request message for a secure memory of a computing device configured to engage in financial transactions, the encrypted reset request message being associated with a request to change control of the secure memory from a first electronic entity to a second electronic entity, the encrypted reset request message originating from a source other than the first electronic entity;

store a communication key within a secure certificate associated with the secure memory of the computing device;

decrypt the encrypted reset request message within the secure memory using the communication key;

verify authorization for the reset request message; and clear parameters associated with the first electronic entity from the secure memory.

24. The system of claim 23, wherein the first electronic entity is a first trusted service manager and the second electronic entity is a second trusted service manager.

25. The system of claim 23, wherein the secure memory is associated with a Near Field Communication interface.

26. The system of claim 23, wherein clearing parameters associated with the secure memory comprises resetting card keys associated with the secure memory.

27. The system of claim 23, wherein the secure memory is comprised in a secure element.

* * * * *